(12) United States Patent
Gross

(10) Patent No.: US 12,489,244 B2
(45) Date of Patent: Dec. 2, 2025

(54) FULLY ASSEMBLED HIGH TEMPERATURE CONNECTOR

(71) Applicant: FCI USA LLC, Etters, PA (US)

(72) Inventor: Charles M. Gross, Dillsburg, PA (US)

(73) Assignee: FCI USA LLC, Etters, PA (US)

( * ) Notice: Subject to any disclaimer, the term of this patent is extended or adjusted under 35 U.S.C. 154(b) by 602 days.

(21) Appl. No.: 17/856,474

(22) Filed: Jul. 1, 2022

(65) Prior Publication Data

US 2023/0006393 A1 Jan. 5, 2023

Related U.S. Application Data

(60) Provisional application No. 63/217,911, filed on Jul. 2, 2021.

(51) Int. Cl.
*H01R 13/527* (2006.01)
*H01R 12/55* (2011.01)
*H01R 24/60* (2011.01)

(52) U.S. Cl.
CPC ........... *H01R 13/527* (2013.01); *H01R 12/55* (2013.01); *H01R 24/60* (2013.01)

(58) Field of Classification Search
None
See application file for complete search history.

(56) References Cited

U.S. PATENT DOCUMENTS

| | | | |
|---|---|---|---|
| 3,844,920 A | 10/1974 | Burgett et al. | |
| 7,563,118 B1 | 7/2009 | McCauley et al. | |
| 8,047,051 B2 | 11/2011 | McCauley et al. | |
| 9,385,463 B2 * | 7/2016 | Sakakibara | G01N 27/4062 |
| 10,451,583 B2 * | 10/2019 | Noda | G01N 27/409 |
| 10,520,463 B2 * | 12/2019 | Oba | G01N 27/4073 |
| 10,876,995 B2 * | 12/2020 | Oba | G01N 33/0027 |
| 11,499,467 B2 * | 11/2022 | Nelson | G02B 7/14 |

FOREIGN PATENT DOCUMENTS

WO    WO 85/02884 A1    7/1985

OTHER PUBLICATIONS https://www.makeitfrom.com/material-properties/Alumina-Aluminum-Oxide-Al2O3, May 30, 2020 (Year: 2020).*

* cited by examiner

*Primary Examiner* — Ross N Gushi
(74) *Attorney, Agent, or Firm* — Wolf, Greenfield & Sacks, P.C.

(57) ABSTRACT

A high temperature electrical connector, which may be used to connect a temperature sensor mounted in a combustion chamber of an automotive engine to a cable. The connector has a housing made of high temperature material, such as alumina ceramic. Connector terminals may be retained within the housing but may float relative to the housing, to reduce stresses associated with differential thermal expansion of the housing and terminals and reduce transmission of vibration and resultant degradation of connector performance. Compliant portions may extend from an intermediate portion of the terminals to make contact with pads on a sensor substrate inserted into the connector. The terminals may be retained with an end cap, secured to the housing. Retention of the terminals may be aided by pockets in the housing that receive tips of the terminals. Channels, receiving the intermediate portions of the terminals, may open into the pockets.

16 Claims, 10 Drawing Sheets

FULLY ASSEMBLED HIGH TEMPERATURE CONNECTOR

CROSS-REFERENCE TO RELATED APPLICATIONS

This application claims priority to and the benefit of U.S. Provisional Application Ser. No. 63/217,911, filed on Jul. 2, 2021, entitled "FULLY ASSEMBLED HIGH TEMPERATURE CONNECTOR," which is incorporated herein by reference in its entirety.

TECHNICAL FIELD

This disclosure relates generally to electrical interconnection systems and more specifically to high temperature connectors.

BACKGROUND

Electrical connectors are used in many electronic systems. It is generally easier and more cost effective to manufacture a system as separate electronic subassemblies, such as printed circuit boards ("PCBs"), sensors, or battery packs, which may be joined together with electrical connectors. In some scenarios, the PCBs or other subassemblies to be joined each have connectors mounted to them, which may be mated to directly interconnect the subassemblies.

In other scenarios, the subassemblies are connected through a cable. Connectors may nonetheless be used to make such connections. The cable may be terminated at at least one end with a cable connector. A PCB or other subassembly may be mated with the cable connector. For example, in some automotive applications, an exhaust sensor may be fabricated on a substrate, such as ceramic wiring board. Connections between the sensor and an engine controller may be made through a cable, terminated with a cable connector. The sensor, on its substrate, may be inserted in the cable connector.

Electrical connectors may be designed to meet one or more requirements. Their designs may be intended to provide certain electrical properties in the conducting paths through the connector. Examples of electrical properties that may be considered in connector design include crosstalk, impedance, bulk resistance or contact resistance. In other instances, the overall connector characteristics may be considered, such as size, cost, weight, thermal resistance, or safety. In yet other instances, mechanical characteristics, such as mating force or un-mating force or reliability may be considered in designing a connector. Often, techniques to achieve one requirement interfere with achieving another requirement such that simultaneously achieving multiple design requirements can be challenging.

SUMMARY

In some embodiments, an electrical connector comprises a ceramic housing and at least one terminal retained within the housing. The housing comprises a first face and a second face, and the first face comprises a slot. The terminal comprises a compliant portion extending into the slot and a tail exposed at the second face.

In some embodiments, an electrical connector comprises an insulative housing and a plurality of terminals disposed within the insulative housing. The insulative housing comprises an outer housing, a first inner housing, and a second inner housing. The first and second inner housings are disposed within the outer housing. The electrical connector additionally comprises one or more clips configured to couple the first inner housing and the second inner housing. The plurality of terminals are disposed at least partially between the first and second inner housings.

In some embodiments, an electrical connector comprises a high temperature insulative housing and a plurality of terminals disposed at least partially within the insulative housing. The insulative housing is formed of a material that withstands temperatures greater than or equal to 1600° F. Each of the plurality of terminals comprises a backbone and at least one compliant portion extending from the backbone. The backbone is retained within the insulative housing so as to float relative to the housing.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1:
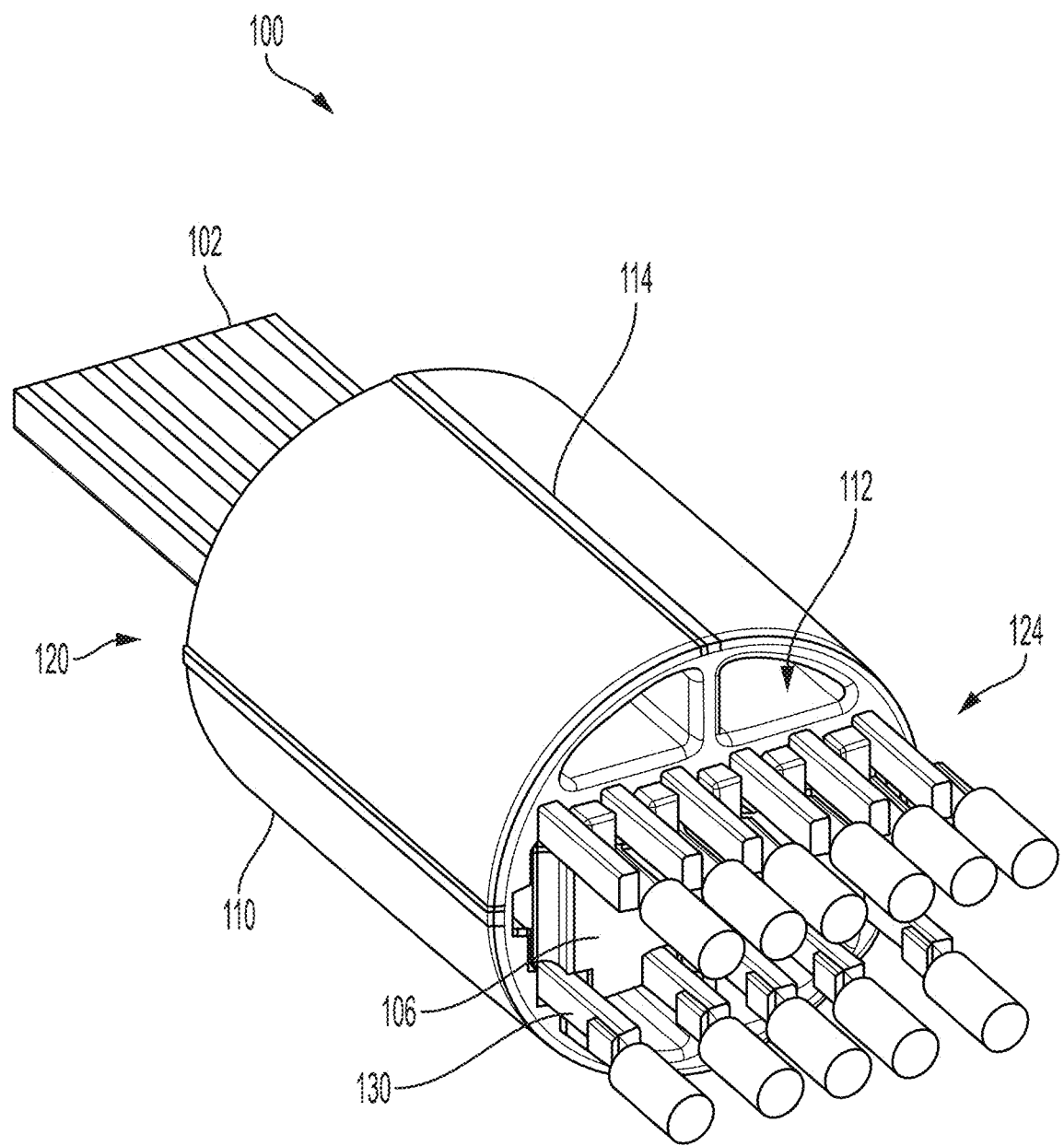
FIG. 1 is a perspective view of one embodiment of a connector.

The inventors have recognized and appreciated designs that yield connectors that simultaneously withstand the high temperature and significant vibration that may occur in a vehicle engine, while providing reliable electrical connections over a long operating life, consistent with the operating life of a vehicle.

Such a connector may be used, for example, to make connections to a temperature sensor assembly to enable temperature measurements within a combustion engine. In situations in which real-time measurements of combustion events are desired, it may be advantageous to place the sensor as close to the combustion point as possible. Although such sensor placement would yield more accurate information about the operation of the engine compared to other locations and would therefore enable better control of engine operation, such as to reduce emissions, the proximity to the combustion point may impose extreme demands on an electrical connector connecting the sensor to an engine controller.

Those extreme demands have deterred others from developing suitable connectors for such demanding applications. The high temperature associated with a mounting location near a combustion point in an engine, for example, may destroy a conventional connector. Additionally, an electrical connector in such an environment may experience extreme temperature cycles, rapidly fluctuating between high temperatures and more moderate temperatures, which may lead to cracking of the connector components or other types of failures in a relatively short time.

The inventors have provided a high temperature connector providing one or more advantages and which may be used in an engine near a combustion point. Such a high temperature connector may be constructed with a housing of a high temperature material, such as molded ceramic. As a specific example, the housing may be formed of an alumina ceramic compound rated for temperatures at least to 1800° F. In some embodiments, the housing may be cylindrical.

The housing may have a first face with a slot shaped to receive a substrate that holds or is connected to a sensor. The slot may extend through the housing and out a second face opposite the first face. The sensor substrate may have conductive pads on one or more surfaces. Terminals with compliant portions may be retained within the connector housing such that the compliant portions extend into the slot. The terminals may be retained in the housing such that the terminals may "float" relative to the housing to resist vibration and to avoid stress associated with differential thermal expansion of the housing and the terminals. The housing, for example, may be formed with channels that receive terminals to position the terminals for making contact with a sensor substrate inserted into the slot. The housing may have a pocket into which a tip of the terminal is inserted, partially retaining the terminal in the housing while allowing the terminal to float.

In some embodiments, each terminal may have multiple compliant portions, each configured to make contact with a pad on a sensor substrate inserted in the slot. Such a configuration may enhance reliable operation. The terminals may also be made of a high temperature material, such as 301, half hardened stainless steel, such that the compliant portions generate spring force against conductive pads on the substrate when the substrate is inserted into the slot. In some embodiments, such as embodiments in which a tip of the terminal engages a pocket of the housing, the compliant portions may extend from an intermediate portion of the terminal.

Tails of the terminals may extend through a second face of the housing, which may be opposite the first face. The tails of the terminals may be connected to wires or other conductive structures that carry signals from the sensor, through the terminals to a remote location, such as an engine controller.

The terminals may be further retained in the housing with an end cap. The end cap may also be made of a high temperature material, such as alumina ceramic. The end cap may be fixed to the housing, blocking at least partially an opening in the second face of the housing through which the terminal tails extend. The end cap may be secured, for example with a high temperature epoxy, blocking the terminals from being withdrawn from the housing. In some embodiments, a high temperature epoxy may include an epoxy with a temperature resistance above 400° F. Unless otherwise specified, as used herein the terms "high temperature epoxy", "high temperature material", and other similar terms may be associated with a temperature resistance above 400° F.

In some embodiments, the connector housing may be formed as a single component, such as with a molding operation. Such a component may have pockets, serving as terminal guides into which the terminals are inserted. In some embodiments, the housing may have voids, which may extend partially or fully from the first face to the second face. The voids may absorb and dissipate heat, thereby prevent cracking during thermal cycles.

In other embodiments, the connector housing may be made of two or more housing components. In some embodiments, the housing may have an inner housing and an outer housing. The inner housing may hold terminals that contact pads on a sensor substrate. The outer housing may have a shape configured for a desired end application, such as a cylinder configured for insertion into a manifold of combustion chamber in an engine. Ribs or other structures may be formed on outer surfaces of the housing to facilitate mounting of the connector in an engine manifold.

The inner housing may be held in the outer housing, such as by spring force generated by compliant components between the inner housing and the outer housing. In some embodiments, an outer surface of the inner housing may be held away from an inner surface of the outer housing, leaving one or more voids through the connector housing between the inner housing and the outer housing. One or more voids partially or fully through the connector housing may enhance thermal resistance of the connector.

In some embodiments, the inner housing may be formed of multiple components. Two inner housing portions, for example, may be held together to form opposite sides of the inner housing with a slot to receive a sensor substrate between them. Each housing portion may hold a row of terminals lining one side of the slot, so as to make contact with pads on a surface of a sensor substrate when inserted in the slot.

In some embodiments, the inner housing portions may be held together with one or more clips. The clips may be exposed on an outer surface of the inner housing such that, when the inner housing is inserted into the outer housing, the clips are compressed between the inner and outer housing, retaining the inner housing in the outer housing. In some embodiments, the clips may be recessed relative to the outer surface of the inner housing, and a portion of the outer surface of the inner housing may directly contact an inner surface of the outer housing.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

Figure 2:
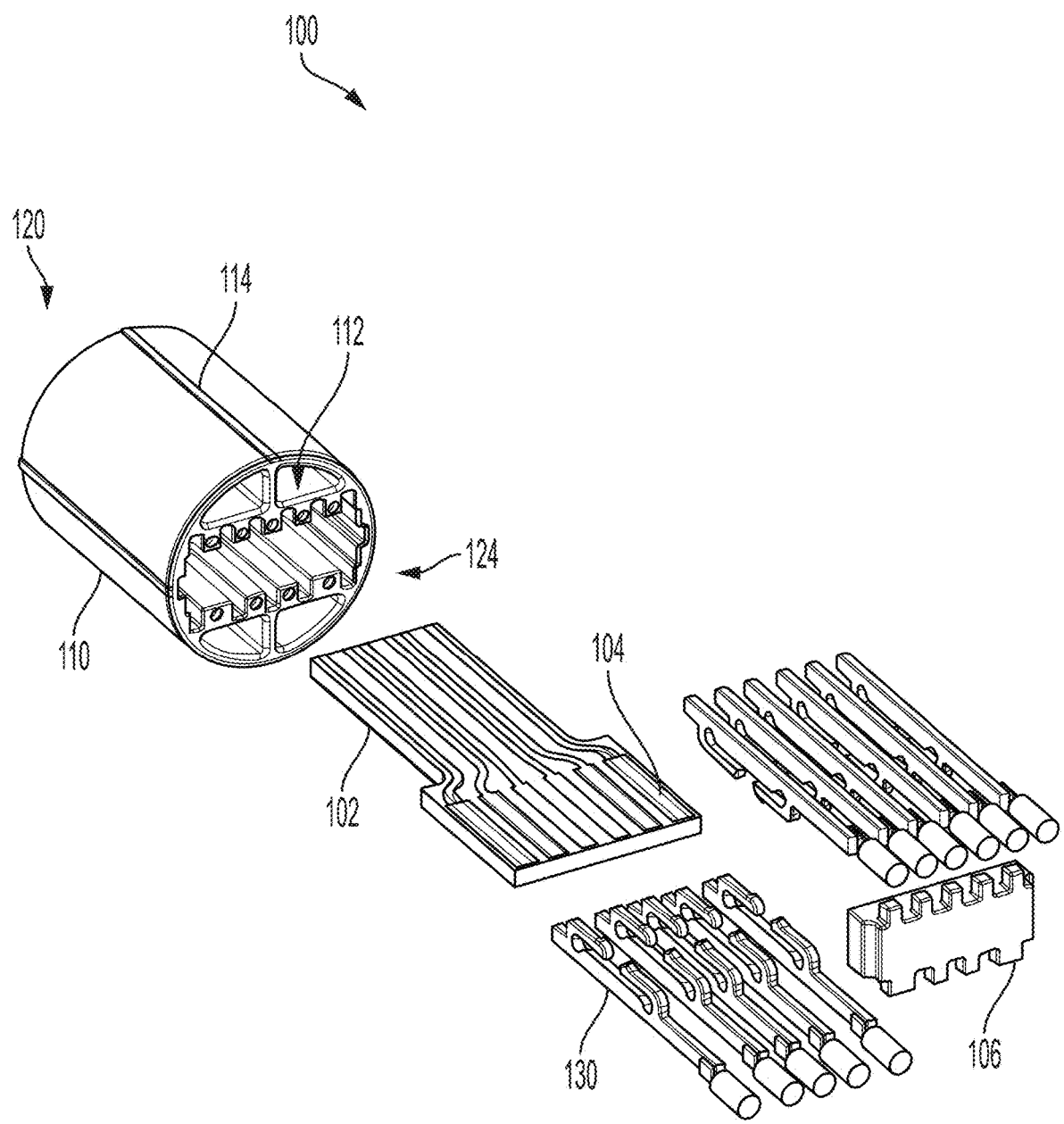
FIG. 2 is an exploded perspective view of the connector of FIG. 1.

FIGS. 1-4 show one embodiment of an electrical connector 100. FIG. 1 is a perspective view of the connector 100, while FIG. 2 is an exploded perspective view of the connector 100. The connector 100 includes a housing 110 and at least one terminal 130 retained within the housing 100.

In some embodiments, the housing 110 is cylindrical. A plurality of projections or ribs 114 may extend radially from an outer surface of the housing 110. The plurality of projections or ribs 114 may be configured to engage with an inner diameter of a tube in which the housing 110 of the connector 100 is inserted. For example, the connector may be mounted in a manifold of an engine to form a connection between a temperature sensor disposed near the combustion point and a processor or controller removed from the connection point. The projections or ribs 114 may both facilitate mounting in an engine manifold as well as provide spacing between the connector housing 110 and the engine manifold, which may enable increased airflow around the connector and more desirable thermal heat transfer characteristics.

In some embodiments, the at least one terminal 130 is electrically connected to a substrate 102. The substrate 102 may be a printed circuit board. The substrate 102 may include or be connected to a sensor (not shown), such as a high temperature sensor. The sensor may be electrically connected to the at least one terminal 130 via electrical connections (e.g., traces or wires) of the substrate 102. As seen in FIG. 2, the at least one terminal 130 may be configured to make contact with one or more conductive pads 104 on the substrate 102. In embodiments with a plurality of terminals 130, the terminals 130 may be configured to contact the substrate 102 on more than one side of the substrate 102. In some embodiments, the substrate 102 may extend out of a first face 120 of the housing 110.

An end cap 106 is configured to secure the at least one terminal 130 relative to the housing 110. In some embodiments, the end cap may be the same material as the housing. In some embodiments, the end cap may be coupled to the housing with a high temperature epoxy. The end cap 106 may be configured to retain the substrate 102 within the housing 110. For example, the substrate 102 may be shaped such to slide into the housing 110 through a second face 124 of the housing 110 such that a portion of the substrate 102 extends out of the first face 120 of the housing 110, but the entire substrate 102 is unable to pass through the first face 120 of the housing 110. When the end cap 106 is secured to the housing 110 (e.g., using a high temperature epoxy), the substrate 102 may be prevented from being removed through the second face 124 of the housing 110.

The housing 110 may be a high temperature insulative housing. In some embodiments, the insulative housing may be formed of a material that withstands temperatures greater than or equal to 1600° F. In some embodiments, the housing 110 of the electrical connector 100 may be ceramic, such as an alumina ceramic compound.

In the embodiment of FIGS. 1 and 2, the housing 110 includes a first face 120 and a second face 124 opposite the first face 120. In some embodiments, one or more voids 112 may extend at least partially from the first face 120 to the second face 124. In some embodiments, the one or more voids 112 may extend fully from the first face 120 to the second face 124. In some embodiments, the voids 112 may extend axially into the housing 110 from the first face 120 or from the second face 124. As described above, the voids may absorb and dissipate heat, thereby prevent cracking during thermal cycles. In some embodiments, such as the embodiment of FIG. 3, a connector housing 110 may not include voids configured to absorb and/or dissipate heat, as the disclosure is not limited in this regard.

Figure 3:
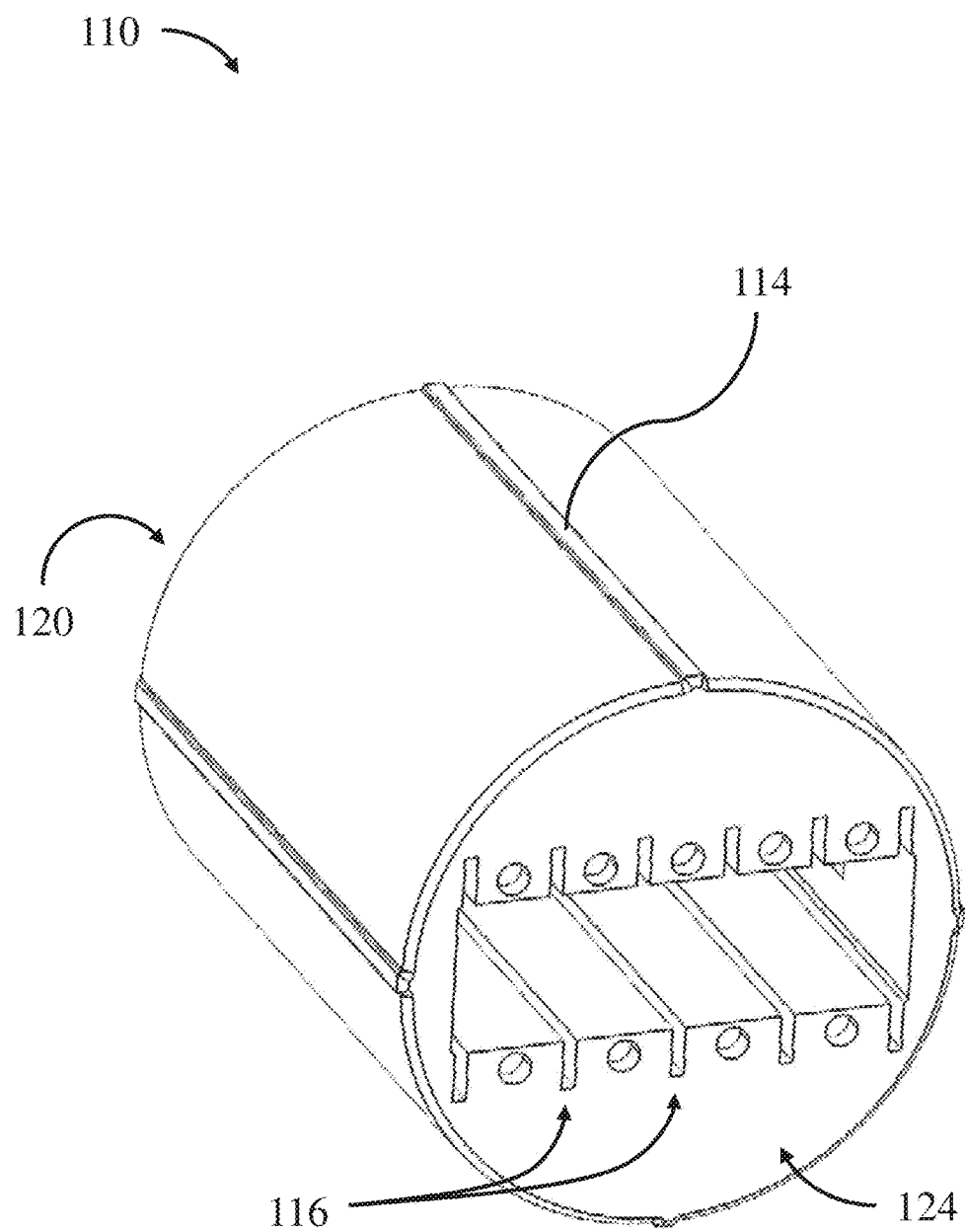
FIG. 3 is a perspective view of one embodiment of a connector housing.
Figure 4:
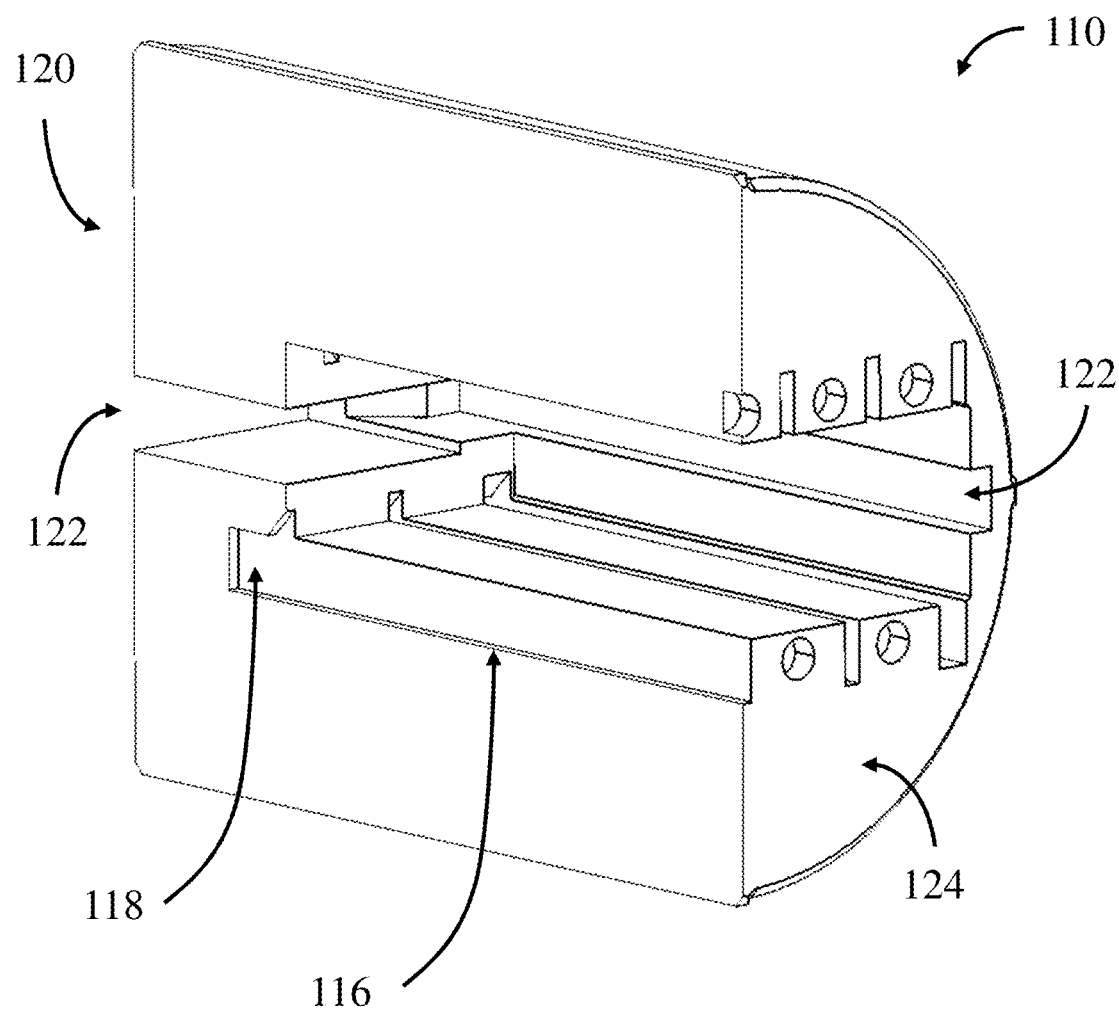
FIG. 4 is a cross-sectional perspective view of the connector housing of FIG. 3.

FIG. 3 is a perspective view of one embodiment of a connector housing 110. FIG. 4 is a cross-sectional perspective view of the connector housing 110 of FIG. 3. In the embodiment of FIGS. 3 and 4, the housing 110 includes a first face 120 and a second face 124. As best seen in FIG. 4, the first face 120 includes a slot 122. In some embodiments, the slot 122 may extend through the housing 110 to the second face 124. In some embodiments, a printed circuit board or other substrate 102 may be inserted into the slot 122 of the housing 110 from the second face 124 of the housing 110. In some embodiments, the substrate 102 may extend through the slot 122 and out of the first face 120 of the housing 110.

The connector housing 110 may include at least one guide 116 configured to accept the at least one terminal 130. As best seen in FIG. 4, the at least one guide 116 may include a pocket 118 configured to accept a tip of the at least one terminal 130. The at least one guide 116, the pocket 118, and/or the at least one terminal 130 may be appropriately sized and/or shaped such that the at least one terminal 130 floats within the at least one guide 116. In some embodiments, the at least one terminal 130 may be configured to float within the pocket 118. As described above, the at least one terminal 130 may float relative to the housing 110 to resist vibration and to avoid stress associated with differential thermal expansion of the housing 110 and the at least one terminal 130.

Figure 5:
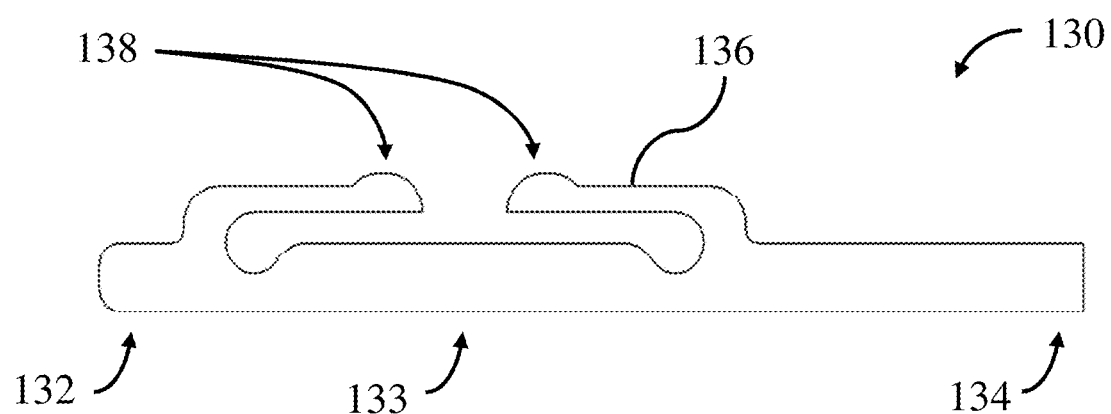
FIG. 5 is a side view of one embodiment of a terminal.

FIG. 5 is a side view of one embodiment of a terminal 130. The terminal 130 includes a backbone including a tip 132, a tail 134, and an intermediate portion 133 extending between the tip 132 and the tail 134. Two compliant portions 136 extend from the intermediate portion 133 of the backbone. Although two compliant portions are shown in the embodiment of FIG. 5, it should be appreciated that a terminal may include any suitable number of compliant portions, as the disclosure is not limited in this regard. The compliant portions 136 are configured to extend into the slot 122 of the housing 110 and contact a conductive pad 104 of the substrate 102. The terminal 130 of FIG. 5 includes two independent contact areas 138, each disposed at a tip of one of the compliant portions 136. As described above, a terminal configured to make multiple contacts with one or more conductive pads of a substrate may be more reliable than a terminal configured to make only a single contact with a conductive pad of a substrate. The tail 134 of the terminal 130 may extend out of the second face 124 of the housing 110 (see, e.g., FIG. 1).

In some embodiments, each compliant portion 136 of the terminal 130 comprises a beam, which comprises an edge facing an edge of the intermediate portion 133 of the terminal 130. In some embodiments, the intermediate portion 133 includes a broadside. Each compliant portion 136 may extend from the edge of the intermediate portion 133 and may be bent such that a surface of the compliant portion 136 is parallel to the broadside of the intermediate portion 133.

Figure 6:
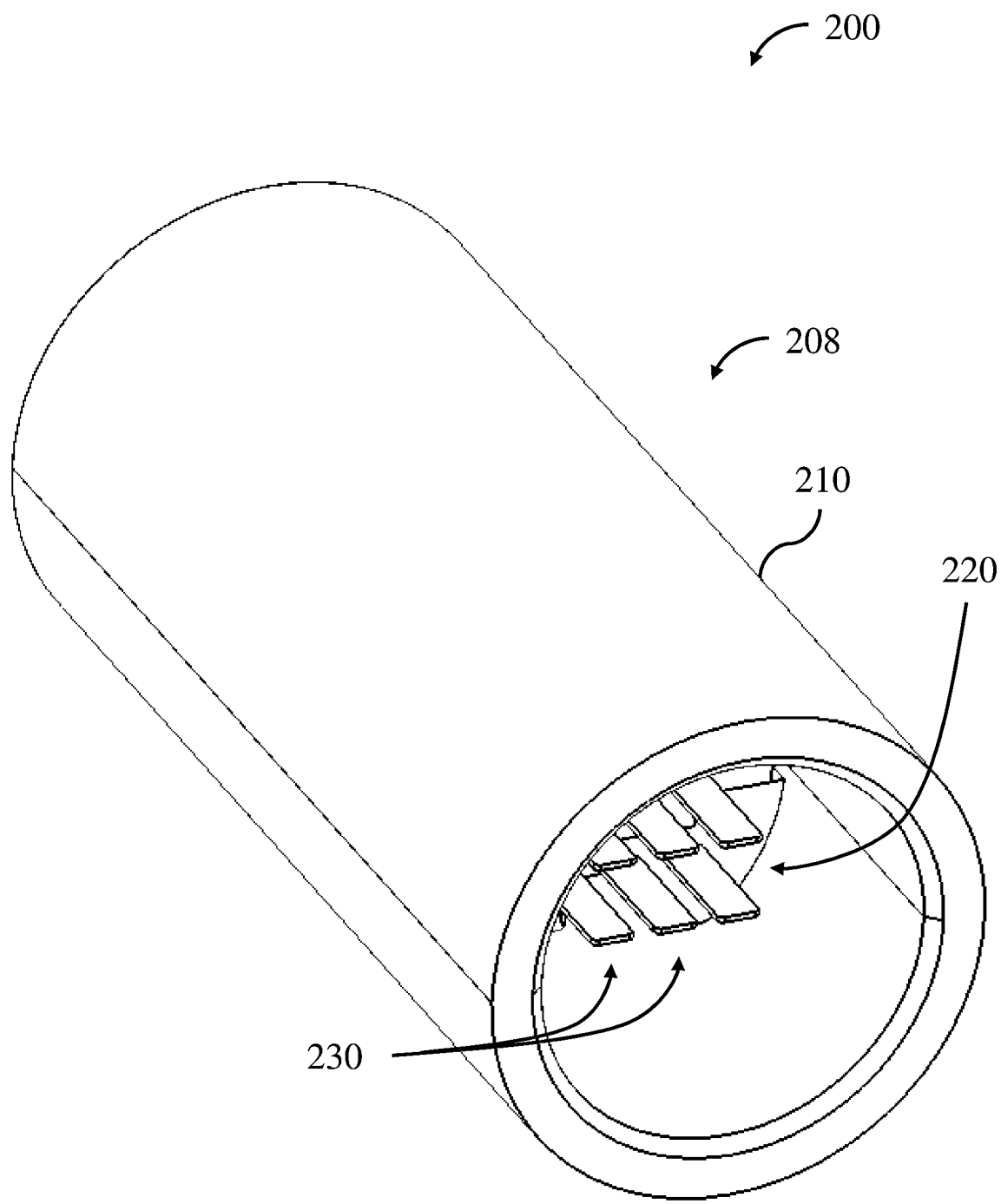
FIG. 6 is a perspective view of another embodiment of a connector.

FIG. 6 is a perspective view of another embodiment of an electrical connector 200. The connector 200 includes an insulative housing 208 comprising an outer housing 210 and an inner housing 220 disposed within the outer housing 210. The outer housing 210 may be cylindrical. In some embodiments, the outer housing 210 may comprise a plurality of portions configured to mate, while in other embodiments the outer housing 210 may comprise a single piece. The connector 200 includes a plurality of terminals 230 disposed within the housing 208.

Figure 7A:
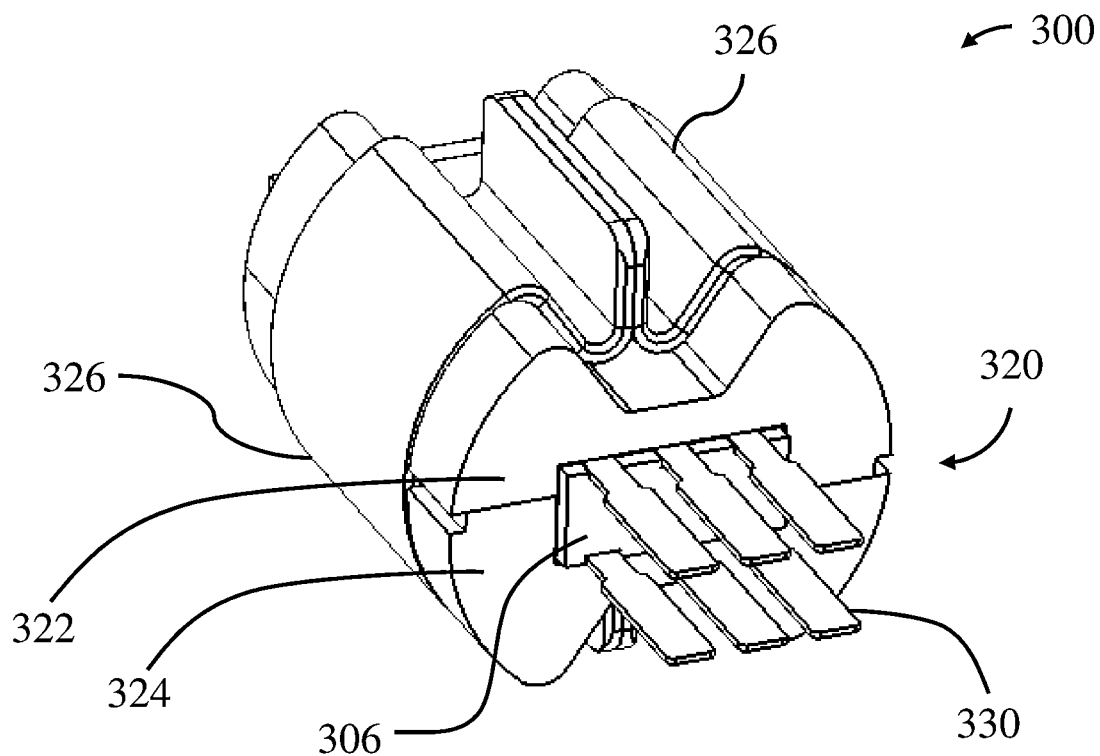
FIG. 7A is a perspective view of one embodiment of connector with the outer housing removed.
Figure 7B:
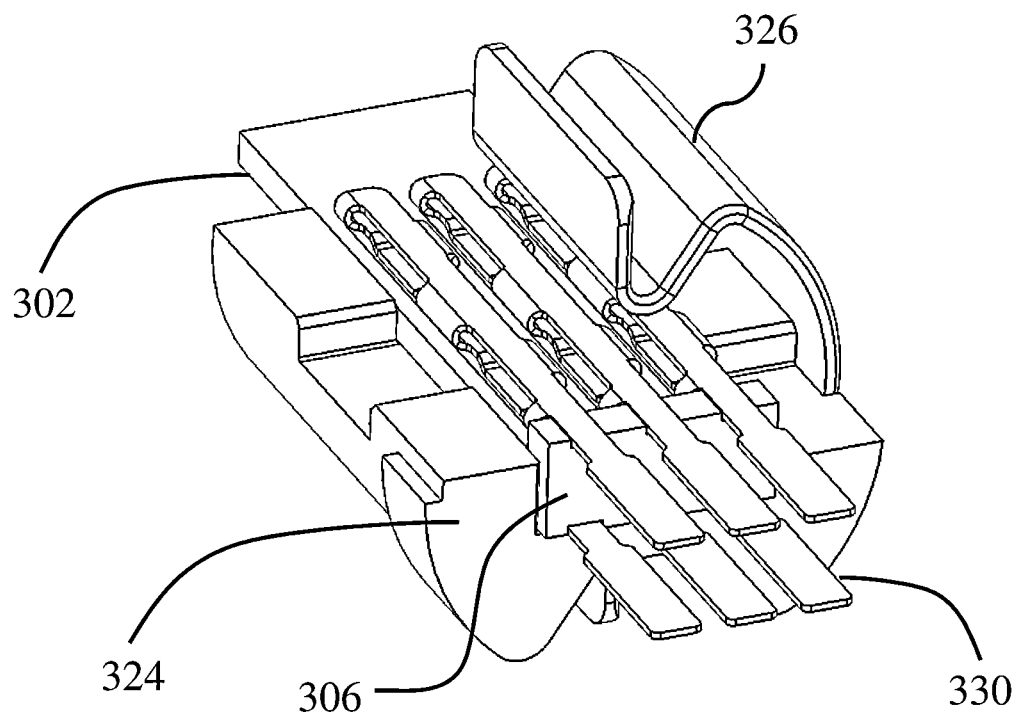
FIG. 7B is a perspective view of the connector of FIG. 7A with a portion of the inner housing removed.
Figure 7C:
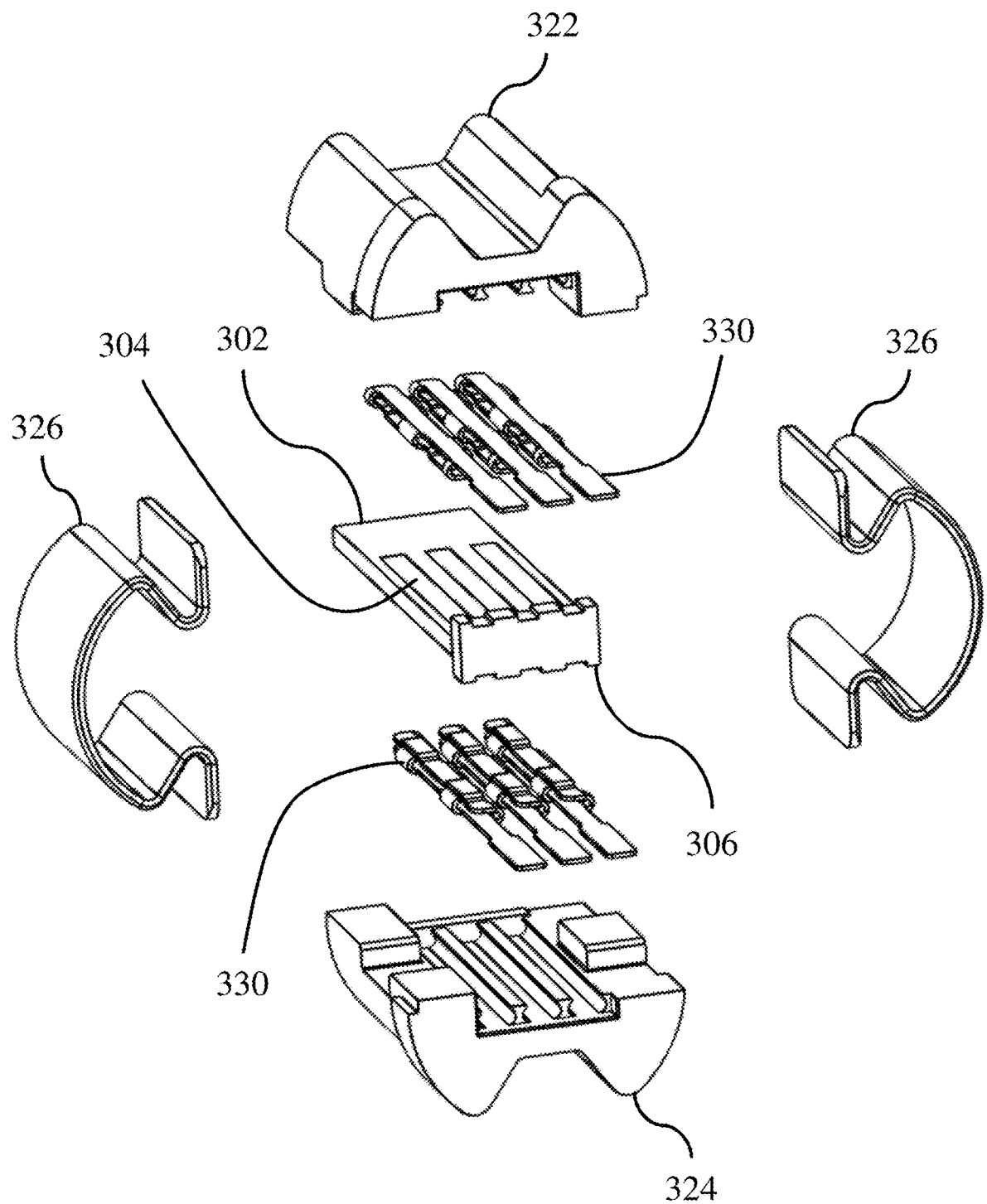
FIG. 7C is an exploded perspective view of the connector of FIG. 7A.
Figure 7D:
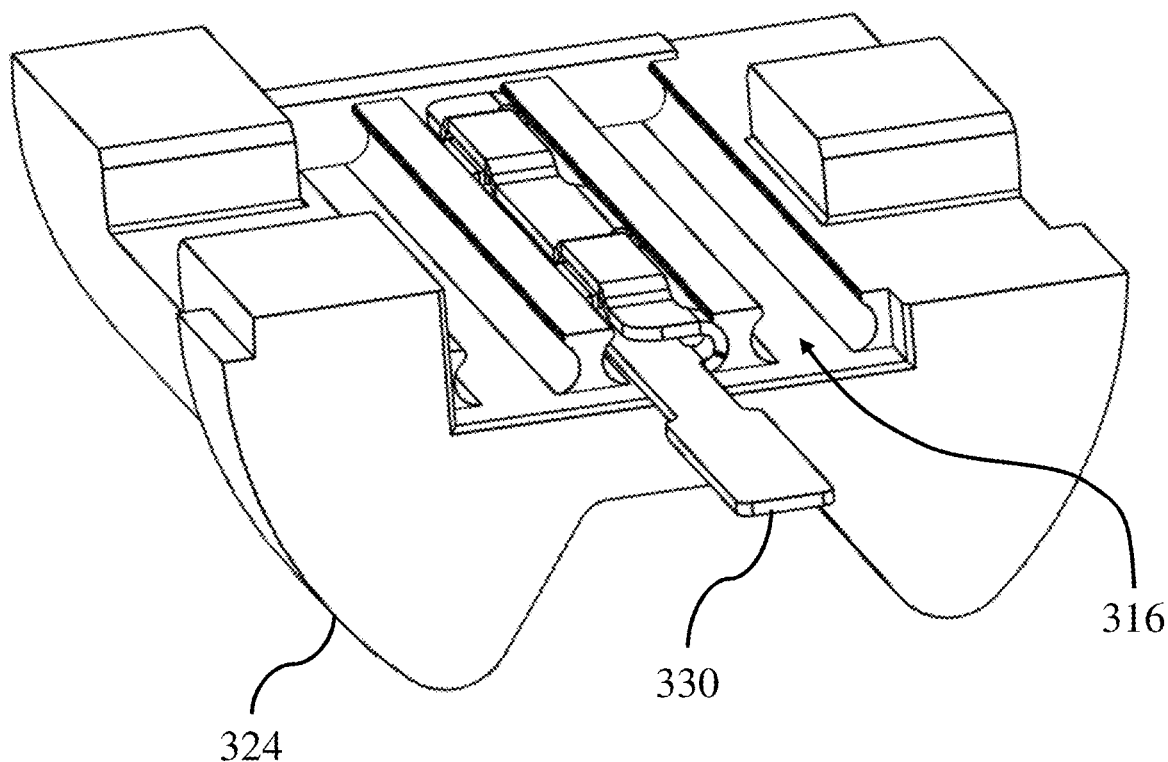
FIG. 7D is a perspective view of the connector of FIG. 7A with a portion of the inner housing removed.

FIGS. 7A-7D show another embodiment of a connector 300. FIG. 7A is a perspective view of the connector 300 with the outer housing removed. While not shown, it should be appreciated that the connector 300 may include an outer housing similar to the outer housing 210 of the connecter 200 shown in FIG. 6. FIG. 7B is a perspective view of the connector 300 with a portion of the inner housing 320 removed. FIG. 7C is an exploded perspective view of the connector 300. FIG. 7D is a perspective view of the connector 300 with a portion of the inner housing 320 removed.

The inner housing 320 comprises a first inner housing 322 and a second inner housing 324. Clips 326 are configured to couple the first inner housing 322 and the second inner housing 324. Although two clips 326 are shown in the figures, it should be appreciated that any suitable number of clips may be used, as the disclosure is not limited in this regard. A plurality of terminals 330 are disposed at least partially between the first inner housing 322 and the second inner housing 324. In some embodiments, an end cap 306 is configured to secure the plurality of terminals 330 relative to at least one of the first inner housing 322 and the second inner housing 324. In some embodiments, a substrate 302 (e.g., a printed circuit board) is disposed between the first inner housing 322 and the second inner housing 324. As described above, a substrate 302 may include contact pads 304 configured to form electrical connections with terminals 330. The inner housing 320 includes guides 316 configured to receive the terminals 330.

Figure 8:
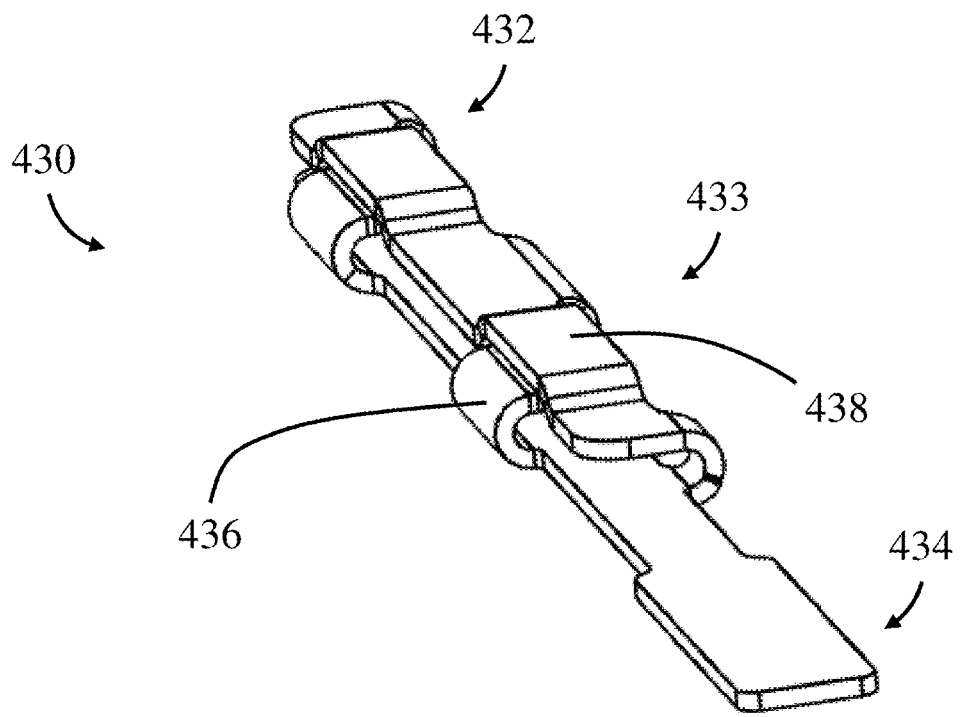
FIG. 8 is a perspective view of another embodiment of a terminal.

FIG. 8 is a perspective view of another embodiment of a terminal 430. The terminal 430 includes a tip 432, a tail 434, and an intermediate portion 433 extending between the tip 432 and the tail 434. Compliant portions 436 extend from the intermediate portion 433 and include contact areas 438 configured to contact with a conductive pad of a substrate of a connector. As described above, a terminal configured to make multiple contacts with a conductive pad of a substrate may be more reliable than a terminal configured to make only a single contact with a conductive pad of a substrate. The tail 434 of the terminal 430 may be configured to extend out of a housing of a connector. The compliant portions 436 of the terminal 430 may be shaped to mate with a guide of an inner housing. For example, a terminal 330 may include compliant portions curved to complement the curves of the guide 316 of the second inner housing 324 of the connector 300, as shown in FIG. 7D.

Figure 9A:
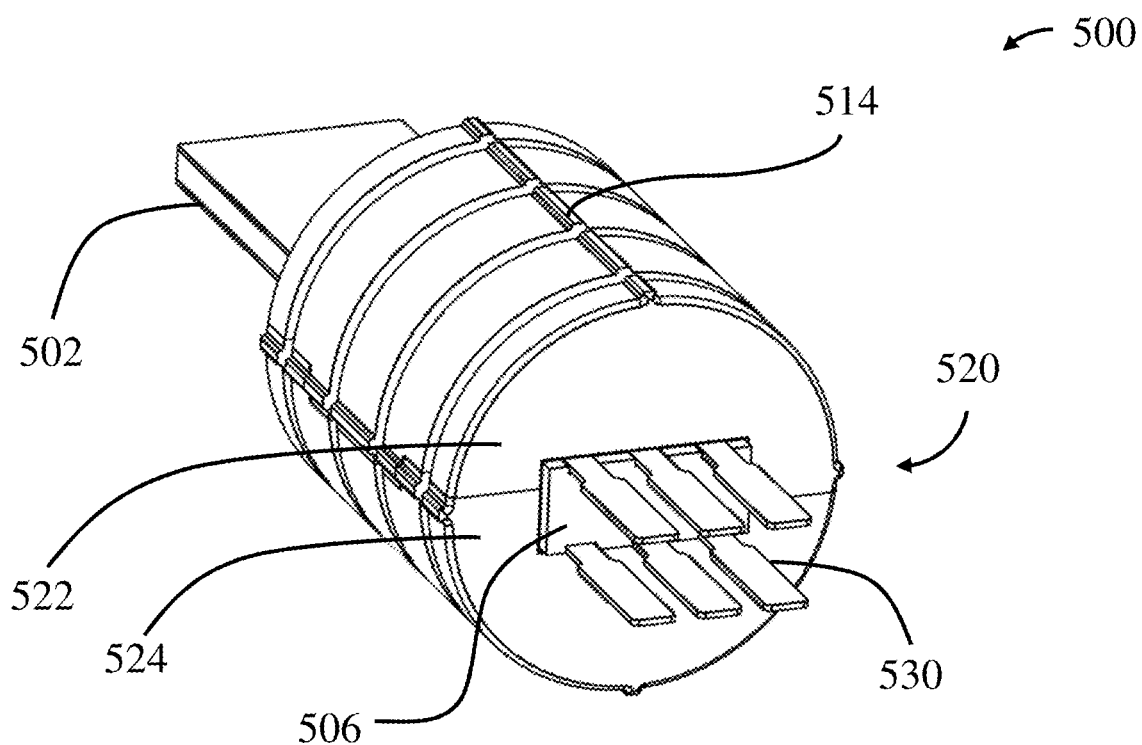
FIG. 9A is a perspective view of another embodiment of connector with the outer housing removed.
Figure 9B:
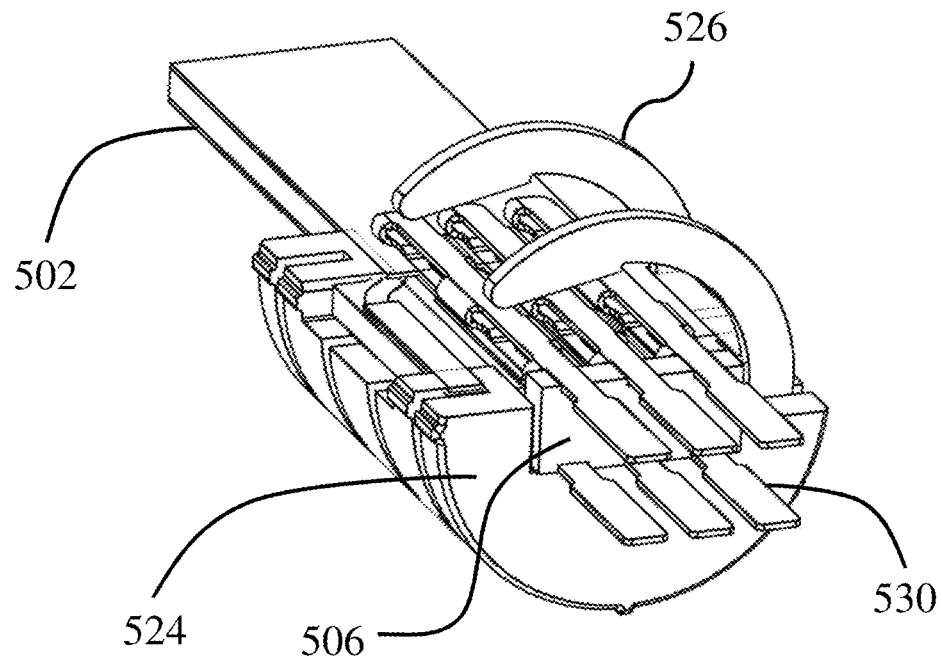
FIG. 9B is a perspective view of the connector of FIG. 9A with a portion of the inner housing removed.
Figure 9C:
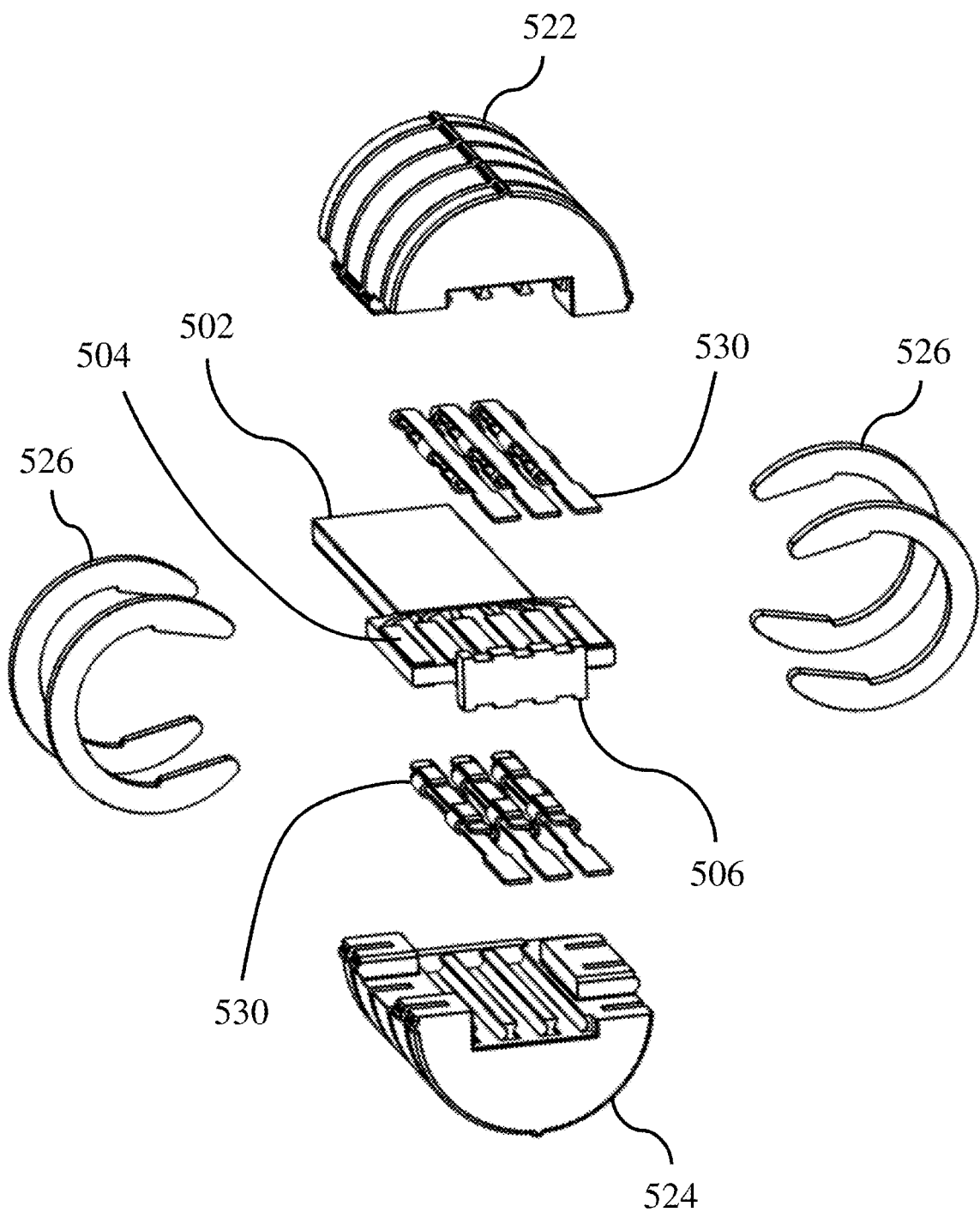
FIG. 9C is an exploded perspective view of the connector of FIG. 9A.

FIGS. 9A-9D show another embodiment of a connector 500. FIG. 9A is a perspective view of the connector 500 with the outer housing removed. While not shown, it should be appreciated that the connector 500 may include an outer housing similar to the outer housing 210 of the connecter 200 shown in FIG. 6. FIG. 9B is a perspective view of the connector 500 with a portion of the inner housing 520 removed. FIG. 9C is an exploded perspective view of the connector 500.

The inner housing 520 comprises a first inner housing 522 and a second inner housing 524. The first inner housing 522 and/or the second inner housing 524 may include projections or ribs 514 that extend radially outward from an outer surface of the first inner housing 522 and/or the second inner housing 524. Clips 526 are configured to couple the first inner housing 522 and the second inner housing 524. In the embodiment of FIGS. 9A-9C, clips 526 are C-clip retaining rings. The first inner housing 522 and/or the second inner housing 524 may include one or more recesses configured to receive the clips 526. A plurality of terminals 530 are disposed at least partially between the first inner housing 522 and the second inner housing 524. In some embodiments, an end cap 506 is configured to secure the plurality of terminals 530 relative to at least one of the first inner housing 522 and the second inner housing 524. In some embodiments, a substrate 502 (e.g., a printed circuit board) is disposed between the first inner housing 522 and the second inner housing 524. As described above, a substrate 502 may include contact pads 504 configured to form electrical connections with terminals 530.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art.

For example, a high temperature connector for making connections to a sensor mounted in a manifold of an engine was described. However, other applications for a high temperature connector are possible, and it should be appreciated that the present disclosure is not limited to connectors associated with combustion engines.

As a further example, a connector is illustrated in which a first face has a slot configured as a high temperature interface to receive a sensor substrate and a second face where terminal tails are exposed such that they can be attached to a wires to form a lower temperature interface. A high temperature and/or lower temperature interface may be implemented in other ways. The tails, for example, may be attached to or press against a wiring board.

Accordingly, the foregoing description and drawings are by way of example only.

What is claimed is:

1. An electrical connector, comprising:
a ceramic housing, the ceramic housing comprising a first face and a second face, the first face comprising a slot; and
at least one terminal retained within the ceramic housing, the terminal comprising an intermediate portion and a tail exposed at the second face, wherein the at least one terminal comprises two compliant portions extending from the intermediate portion and into the slot, wherein:
the ceramic housing includes at least one guide configured to accept the at least one terminal,
the at least one guide includes a pocket configured to accept a tip of the at least one terminal, and
the at least one terminal floats within the pocket.

2. The electrical connector of claim 1, wherein the ceramic housing comprises one or more voids extending at least partially from the first face to the second face.

3. The electrical connector of claim 1, further comprising an end cap configured to secure the at least one terminal relative to the ceramic housing.

4. The electrical connector of claim 3, wherein the end cap is coupled to the ceramic housing with a high temperature epoxy.

5. The electrical connector of claim 1, wherein the ceramic housing is cylindrical.

6. The electrical connector of claim 5, wherein the ceramic housing comprises a plurality of projections extending radially from an outer surface of the ceramic housing, and wherein the plurality of projections are configured to engage the housing with an inner diameter of a tube.

7. The electrical connector of claim 1, wherein the at least one terminal includes two or more independent contact areas.

8. The electrical connector of claim 1, wherein the material of the ceramic housing is an alumina ceramic compound.

9. The electrical connector of claim 1, wherein each of the at least one terminal comprises a tip, wherein the intermediate portion extends between the tip and the tail.

10. The electrical connector of claim 1, wherein a material of the at least one terminal is stainless steel.

11. An electrical connector, comprising:
a ceramic housing, the ceramic housing comprising a first face and a second face, the first face comprising a slot; and
at least one terminal retained within the ceramic housing, each of the at least one terminal comprising a tip, a tail exposed at the second face, an intermediate portion extending between the tip and the tail, and a compliant portion extending into the slot, wherein the compliant portion extends from the intermediate portion, the intermediate portion comprises an edge, and the compliant portion comprises a beam comprising an edge facing the edge of the intermediate portion.

12. An electrical connector comprising:
a high temperature insulative housing, wherein the high temperature insulative housing is formed of a material that withstands temperatures greater than or equal to 1600° F.; and
a plurality of terminals disposed at least partially within the high temperature insulative housing, each of the plurality of terminals comprising a backbone and at least one compliant portion extending from the backbone, wherein at least a portion of the backbone from which the at least one compliant portion extends is retained within the high temperature insulative housing so as to float relative to the high temperature insulative housing.

13. The electrical connector of claim 12, wherein:
the at least one compliant portion comprises two compliant portions;
the backbone comprises a tip, a tail, an intermediate portion extending between the tip and the tail, and
the two compliant portions extend from the intermediate portion.

14. The electrical connector of claim 12, wherein the backbone comprises a first edge, and the at least one compliant portion comprises a beam comprising a second edge facing the first edge of the backbone.

15. The electrical connector of claim 12, wherein the high temperature insulative housing includes at least one guide configured to accept at least one of the plurality of terminals, wherein the at least one guide includes a pocket configured to accept a tip of the at least one of the plurality of terminals.

16. The electrical connector of claim 15, wherein the at least one of the plurality of terminals floats within the pocket.

* * * * *